United States Patent

[11] 3,608,058

[72] Inventor Paul M. Coffman
 Cherry Hill, N.J.
[21] Appl. No. 857,176
[22] Filed Sept. 11, 1969
[45] Patented Sept. 21, 1971
[73] Assignee Shell Oil Company
 New York, N.Y.
 Continuation-in-part of application Ser. No.
 633,673, Apr. 19, 1967, now abandoned,
 which is a continuation-in-part of
 application Ser. No. 524,743, Feb. 3, 1966,
 now abandoned.

[54] METHOD FOR MANUFACTURE OF VOID-FREE AND WARP-FREE SLAB STOCK
 4 Claims, 12 Drawing Figs.

[52] U.S. Cl. ..................................................... 264/313, 264/327

[51] Int. Cl. ........................................................ B29c 1/02
[50] Field of Search ............................................ 264/313

[56] References Cited
UNITED STATES PATENTS

| | | | |
|---|---|---|---|
| 461,777 | 1891 | Beyer ........................... | 18/DIG. |
| 2,379,218 | 6/1945 | Dial .............................. | 264/313 |
| 3,079,642 | 3/1963 | Needham ..................... | 264/313 X |
| 3,431,326 | 3/1969 | Letter ........................... | 264/313 X |

*Primary Examiner*—Robert F. White
*Assistant Examiner*—Richard R. Kucia
*Attorneys*—Joseph W. Brown and Martin S. Baer ABSTRACT: Void-free slabs or billets of thermoplastic polymer are produced by cooling polymer melt in a mold under pressure while keeping part of the melt in contact with a heat-insulating deformable surface of the mold cavity.

3,608,058

INVENTOR:
PAUL M. COFFMAN
BY: Martin S. Baer
HIS ATTORNEY

METHOD FOR MANUFACTURE OF VOID-FREE AND WARP-FREE SLAB STOCK

This application is a continuation-in-part of U.S. Pat. applications Ser. No. 633,673 which is a continuation-in-part of Ser. No. 524,743, now both abandoned.

This invention relates to a method for producing thermoplastic articles and particularly for producing slab-stock or billets of substantial weight and thickness, free of internal voids and other defects, adapted to conversion to useful articles by forming without remelting. The invention is particularly adapted to the formation of large relatively thick slabs of solid crystalline polypropylene and high-density polyethylene.

The methods in current use for production of plastic parts are predominantly injection molding, blow molding and extrusion. The rapid growth in use of plastic parts in recent years can be credited mainly to the large output, in number of pieces or in cubic inches of formed product per man hour, which is due to the short time cycles in molding equipment and the high throughput rates in extrusion equipment. However, such short time cycles or rapid throughput rates can be obtained only when the formed articles have relatively thin walls, because the time required for controlled cooling of an article from the molten state to a desired temperature at which it is solid increases approximately with the square of the maximum thickness. Cooling must be controlled to avoid various defects such as warping, internal void formation and internal stresses. An article of 1/16 inch maximum thickness can be solidified from its melt in seconds, but it requires 20 minutes or more in the mold to solidify an article of 1 inch thickness. Accordingly, mass production of articles of substantial thickness by conventional molding methods is today economically prohibitive because the required long cooling times limit the output from expensive equipment. The thickness of injection molded or extruded articles today is generally not greater than about one-eighth inch.

A further limitation of the widely used plastics injection molding and extrusion processes is that they are not practical for conversion of polymers of very high molecular weight, such as polypropylene of intrinsic viscosity " of 4.5 or more (corresponding to weight average molecular weights of 800,000 and up), or high molecular weight polyethylene (having weight average molecular weights of 800,000 to several millions) which would be most desirable for the production of articles of outstanding impact strength and abrasion resistance.

" Unless otherwise stated, intrinsic viscosity (I.V.) herein refers to values determined from decalin solutions of the polymer at 150°C, reported in dl/g units.

When it is desired to produce strong, rigid plastic parts, i.e., relatively thick-walled or solid articles, especially from tough plastics of extra-high molecular weight, conventional methods are seriously deficient.

It has been found that thermoplastics such as polyethylene and polypropylene, including those of very high molecular weight, can be converted to shaped articles by rapid forming operations applied to billets of polymer at a temperature below its melt temperature. To provide fault-free articles, the billet must be of suitable shape, usually smooth walled, and free of surface defects as well as of internal defects such as internal voids, stresses or flow lines.

The main object of this invention is to provide in an economical manner slabs and billets of thermoplastic polymer, particularly of polypropylene or high density polyethylene, which are free of internal voids, surface sinks, warp and other defects and can be converted into useful articles by shaping methods in which the polymer remains unmelted.

Other objects of this invention will appear from the following description, in which reference is made to the drawing wherein:

FIG. 3 being a view of the apparatus and molded article on completion of the molding cycle;

One of the characteristics of polypropylene and high-density polyethylene is the large shrinkage in cooling from a liquid to a solid material. For example, polypropylene shrinks about 15 percent in volume and high-density polyethylene about 25 percent in cooling from 400° F. to room temperature. In conventional methods of cooling a melt of such polymer in a mold, the surface of the polymer mass hardens while the interior part remains molten. As the interior also finally solidifies, surface sinks, internal voids and internal stresses are developed, especially in thick sections. Solid articles containing such internal voids and stresses are generally not suitable for conversion to useful articles by forming or finishing methods in which the polymer remains unmelted. Conventional molding is therefore not adequate for forming thick articles such as slabs or billets, free of internal voids and other defects.

A method for molding large void-free polyolefin blocks is disclosed by Needham et al. in U.S. Pat. No. 3,079,642. The method comprises placing molten polymer in a block mold, applying pressure while the polymer is cooled until a hardened skin is formed, removing the partially colled block from the mold and permitting cooling to be completed while pressure is applied to two faces of the block, the remainder of the block remaining unconfined. As pointed out in the patent, the skin of the unconfined portion of the block will tend to rupture unless care is taken not to apply excessive pressure. Insufficient pressure, on the other hand, results in a block which is not void-free. A necessary result of the method of Needham et al. is that a block is formed which has convex sides, for example, a 1 inch block has sides that extend at the center one-fourth inch beyond the edges of the upper and lower surfaces. Substantial trimming, with consequent waste, is necessary to produce blocks having straight sides.

The method and apparatus of the present invention make possible the production of large, thick, molded thermoplastic articles, such as slabs or billets, which are substantially free of internal voids and other defects without the disadvantages encountered in the method of the Needham et al. These articles may be useful as such, but are especially useful for further conversion into other articles of substantial thickness by conversion methods not requiring remelting of the polymer. In a preferred mode of practicing this invention, articles are formed which have straight sidewalls.

The apparatus required for carrying out the methods of this invention is quite inexpensive compared to apparatus required for producing thermoplastic shapes by methods such as injection molding, blow molding or extrusion. Slabs and billets produced by this invention are relatively inexpensive and can be converted to finished articles of more complex shape at a high rate in an economical overall process.

Figure 1:
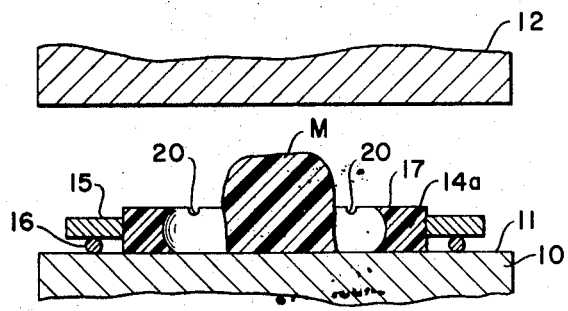
FIGS. 1, 2 and 3 illustrate one mode of practicing this invention, FIG. 1 being a diagrammatic view in vertical section of apparatus in which a molten plastic mass is in position for molding, FIG. 2 being in view of the apparatus of FIG. 1 while the plastic mass is under molding pressure.
Figure 2:
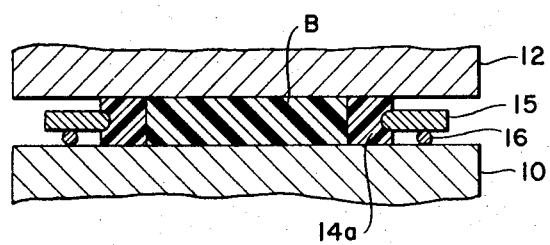
Figure 3:
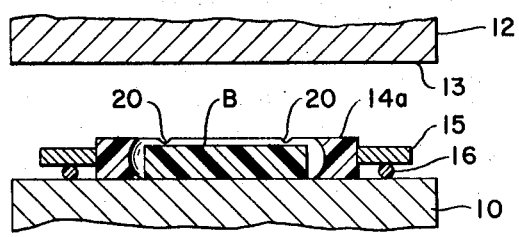

Referring now to the drawing, wherein corresponding parts are designated by the same numeral, a preferred embodiment of the apparatus and its use in the method of forming a plastic article according to this invention are illustrated in FIGS. 1, 2 and 3. The principal parts of the apparatus are a rigid lower press or platen member 10, having a flat surface 11; a rigid upper press or platen member 12, having a flat surface 13; a deformable die member 14a; a rigid backup ring 15; and a shim 16 which supports the backup ring.

The upper and lower platen may be individually movable toward and away from each other, or one may be stationary and the other movable. Their surfaces are parallel. The surfaces 11 and 13 constitute the upper and lower surfaces of the die in which the polymer billets are formed. At least one and preferably both the platen members are adapted to cool polymer in the mold.

The circumference of the plastic article is defined by die member 14a, which is a deformable body made of material which is essentially rigid when not subjected to force, is capable of flow under molding pressure, and is a poor conductor of heat.

The deformable die member is typically made of rubber or of a rubberlike material or composition; this includes any elastomeric materials, such as vulcanized rubber and synthetic elastomers, which have sufficient rigidity to retain their shape when not under pressure and which are within their elastic limits capable of flow similar to that of a liquid when under pressure during the molding process. The chemical composition of the elastomer is not important from the point of view of this invention, provided it has the desired physical characteristics, including poor heat conductance, is not degraded at the highest temperatures to which it will be exposed during the molding operation, and is chemically inert to the thermoplastic charge.

Figure 9:
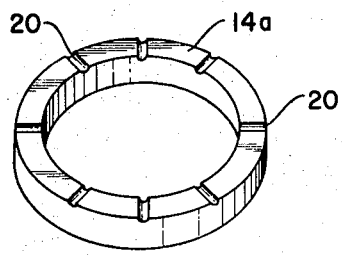
FIGS. 9, 10 and 11 are isometric views of shapes of deformable die members which can be utilized in the method of this invention.
Figure 10:
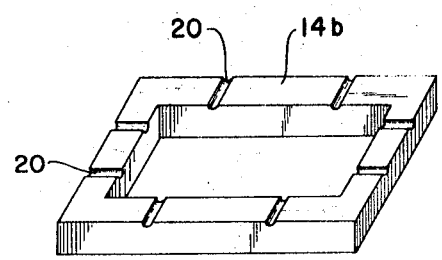

The deformable die member or die ring may be of circular, rectangular or any other desired configuration. A circular and a square die ring are illustrated in FIGS. 9 and 10 as rings 14a and 14b, respectively.

An important feature of die ring 14a is that its upper surface is grooved or notched at intervals with slots, grooves or notches 20. These serve to permit captured air to escape during the molding process. There should be at least four such slots spaced about 90° apart, but a much larger number may be employed if desired.

The wall configuration of the die ring affects the shape of the plastic billet formed in the process. In the method of Needham et al. for example, the plastic mass solidifies while unconfined at its sides, resulting in a block having convex sidewalls. A billet having convex sidewalls is also obtained if the deformable die ring used in this invention has a straight wall, especially if it is used either without a backup ring or with a backup to its full height, e.g., when it is used as liner for a right cylindrical die.

The die ring is selected so that the volume enclosed by the undeformed die ring and the rigid die surfaces is about the same as the volume of polymer melt needed to produce the desired billet. The height of the die ring is generally 115–135 percent of the height of the finished billet.

The grooves in the die ring may be narrow slots, e.g., one-sixteenth inch by one-sixteenth inch in section. Their dimensions are not critical. They should be relatively shallow, e.g., 10 percent or less of the height of the die ring, and should in any event terminate above the level of the finished billet.

Preferred embodiments of the die ring are illustrated in FIGS. 1–3 and 9. Here the die ring has an inner wall of concave curvature. When used with a rigid backup ring whose height is about one-half of the height of the finished billet, as illustrated, the latter will have completely or substantially straight sidewalls. The backup ring is preferably from one-quarter to three-quarters of the height of the billet being formed and should be vertically centered, being supported by a suitable shim, as illustrated.

In an alternative embodiment of this invention, the deformable body, 14c, is a hollow, fluid-filled, closed shape. An air-inflated rubber tube can serve very satisfactorily. It has been found that the pressure required during the forming operation is drastically reduced when a fluid-filled liner is employed. For example, in molding a polypropylene billet according to this invention, utilizing a solid rubber liner illustrated in FIG. 1, a pressure of about 50 p.s.i. is generally required for production of satisfactory void-free billets. When the solid liner is replaced with an air-filled rubber tube, equally good results are obtained at a pressure of only 10 p.s.i.

Figure 4:
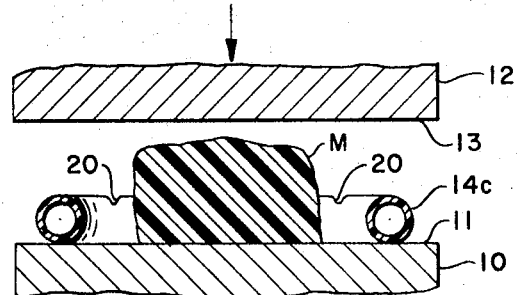
FIGS. 4 and 5 illustrate an alternative mode of practicing this invention, FIG. 4 being a diagrammatic view in vertical section of an apparatus in which a molten plastic mass is in position for molding and FIG. 5 being a view of the apparatus of FIG. 4 while the plastic mass is under molding pressure.
Figure 5:
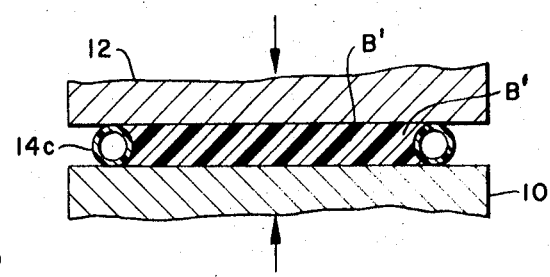
Figure 11:
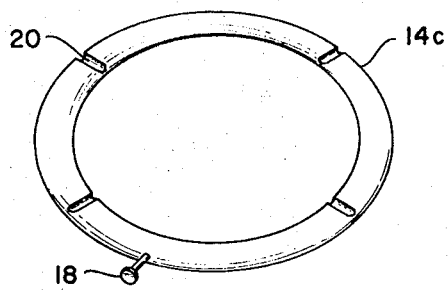

The use of a fluid-filled die member is illustrated in FIGS. 4 and 5, and the die ring in FIG. 11. The apparatus consists of two opposed, flat-surfaced rams 10 and 12 having rigid, flat surfaces 11 and 13 and a hollow, fluid-filled, closed shape 14c, provided with grooves 20, acting as deformable die. Deformable die 14c may, for example, be an air-filled rubber toroid having air-escape grooves 20 and a valve 18, as shown in FIG. 11. In most cases a tube having the structure of the inner tube of a bicycle tire will be sufficiently strong. If the tube has a valve, this of course, is preferably on the side opposite that which contacts the plastic mass.

In another modification of the invention, the grooved, fluid-filled deformable die 14c of FIGS. 4, 5 and 11 may be replaced by a solid deformable shape, such as a solid rubber toroid.

Conventional parts of the apparatus which are not required to explain the present invention are not shown in the drawing. For example, the conventional heating and cooling means which permit controlling the temperature of the rigid die members are omitted. Also not shown are the press employed for forcing the die surfaces together during the molding operation, and associated equipment such as means for removing the completed article.

In the formation of void-free thermoplastic articles by compression molding according to this invention, FIG. 1 illustrates the position of the dies after a molten plastic mass M has been placed on platen surface 11. Platen members 10 and 12 are then urged toward each other. One may be stationary or both may be moved. When the upper surface 13 contacts the plastic mass it forces the mass to conform to the shape defined by die surfaces 11 and 13 and deformable die member 14a. As the mold cavity closes, upper platen surface 13 first contacts plastic mass M, causing the mass to flatten and flow out toward die member 14a. When upper platen surface 13 first contacts surface 17 of the die ring, the plastic mass has not completely filled the available space. At that point, air would be trapped in the die if slots 20 were not provided. With the slots present, trapped air escapes as the gap between the platens continues to decrease. When the polymer has completely filled the available mold space, the pressure is maintained but there is no further substantial immediate movement. Cooling is then carried out by circulating cooling fluid through at least one, and suitably both platens. The elastomeric material of the liner acts as insulator and prevents or slows down hardening of the molten plastic mass with which it is in contact, so long as a substantial portion of the total of plastic mass M is still molten. Accordingly, while the plastic mass cools and shrinks, the portions thereof which contact the colled die surfaces harden first. Pressure is maintained while the plastic mass cools and shrinks. This mold pressure forces elastomeric insert 14a gradually to deform, by liquidlike flow, into the configuration illustrated in FIG. 2. Since the molten portion of the plastic mass is under continuous molding pressure, it solidifies into a void-free, substantially strain-free solid body B.

The molding operation illustrated in FIGS. 4 and 5 is essentially like that of FIGS. 1 and 2. FIG. 4 illustrates the apparatus with molten plastic mass M in place and FIG. 5 after full molding pressure is applied. As pointed out above, the use of a fluid-filled deformable die ring permits molding of excellent, void-free articles at pressures as low as 10 p.s.i.

Figure 6:
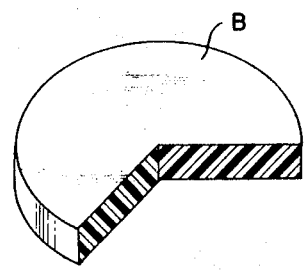
FIGS. 6 and 7 are isometric views of articles produced according to this invention.
Figure 7:
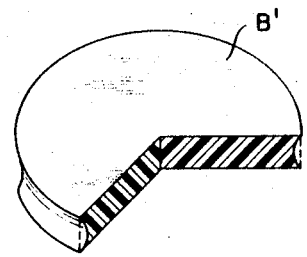

FIG. 6 illustrates a circular billet B formed according to this invention; a segment is cut away for easier understanding of its shape. The top and bottom surfaces are flat and smooth, conforming to die surfaces 11a and 12a. The edges are essentially straight as a result of the use of concave-walled die ring 14 and backup ring 15. FIG. 7 illustrates a billet B' with concave sides, such as may be produced, for example, by the method of FIGS. 4 and 5 or by using a solid die ring with straight inside walls.

Figure 8:
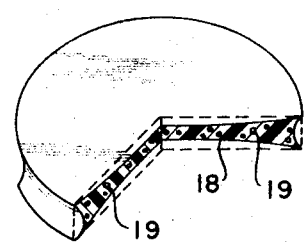
FIG. 8 is an isometric view of a defective article, produced without utilizing this invention.

FIG. 8 illustrates what happens when a plastic mass is compression molded in a rigid die mold having a straight, rigid diewall surface. After the mass has solidified, it is found to contain internal voids 19 and to have a concave sidewall and concave, more-or-less lens-shaped top and bottom surfaces 18. While the lens-shaped surfaces can be machined to plane surfaces, albeit with substantial wastage of material, the internal voids and associated stresses make such a molded article useless for many further forming operations.

Several possible shapes of the elastomeric insulating mold member are illustrated in FIGS. 9, 10 and 11. FIG. 9 illustrates a tubular ring, 14a, having a concave inside wall, as used in the method of FIGS. 1–3. FIG. 11 illustrates a hollow, fluid-filled, toroid, 14c, suitable for use as illustrated in FIGS. 4 and 5. It may be an air-filled rubber tube, such as the inner tube or a bicycle tire, provided with grooves or corrugations 20, and may have a valve 18. It may also be a reinforced tube, having a structure similar to a tubular tire. FIG. 10 illustrates a square tubular mold member.

Figure 12:
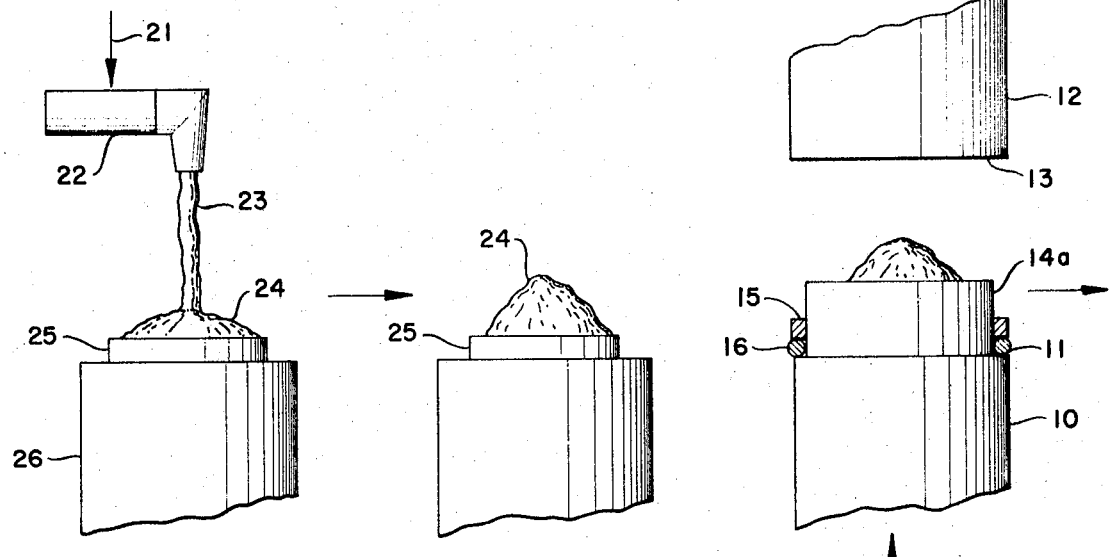
FIG. 12 is a schematic view of an apparatus assembly illustrating the process of forming articles according to this invention.

FIG. 12 illustrates a preferred mode of practicing the process according to this invention. Thermoplastic polymer to be molded is charged in any desired form, e.g., as nibs or pellets, through line 21 to a machine 22 wherein the polymer is converted to a molten mass. The machine is typically a screw extruder. The molten polymer is typically quite viscous, having, for example, a viscosity in the range of $10^4$ to $10^6$ poise. A stream 23 of such melt is separated into portions 24 of predetermined weight. For example, melt may be collected on a sheet or thin plate 25 which has a surface to which the polymer does not adhere, e.g., a surface coated with a fluorohydrocarbon polymer such as polytetrafluoroethylene. The sheet or plate rests on a table 26 which may be a weighing table or a portable table on a scale. The surface of table 26, or sheet 25, is heated or heavily insulated to prevent premature cooling of the polymer melt. Sheet 25 or table 26 is removed and replaced by another after a slab of predetermined weight has been collected. Polymer mass 24 is thicker, but smaller in area, than the mold. It is transferred to the molding station where it is placed on the surface 11 of platen 10. Rubber die ring 14a, skin 15 and backup ring 16 are then placed on die surface 11. The die is then closed and the melt is molded into a void-free, strain-free article as previously described. The mold is opened, and the article is removed from the surface of platen 10, and transferred, if necessary, to a trimming station, not shown, where any irregular edge portion of the billet is trimmed off, leaving it a smooth-sided disc capable of further conversion to a useful article by other forming methods. Other trimming operations may be performed, e.g., planing the top and bottom surfaces, drilling holes or the like. The prepared billets are suitable for conversion into finished articles of more complex shapes by forming operations in which the polymer undergoes flow while in the solid state.

A preferred embodiment of this invention has been described. The process and apparatus of this invention are, however, capable of other modifications while remaining within the scope of this invention. Examples of simple modifications include the use of multiple molds in a single press or use of the yieldable die ring as inserts in a rigid cylindrical die.

In the practice of the described processes, the polymer may be a polypropylene composition charged to a screw extruder 21 in the form of nibs in intimate mixture with scrap recovered from the trimming step and ground to suitable size. The polymer is extruded at a temperature above its crystal melting point (the melting point being about 335° F. for polypropylene and about 260° F. for linear polyethylene) and preferably at a temperature in the range from 40°–200° F. above the crystal melting point. 450° F. is practical for polypropylene. The capacity of the extruder is calculated to produce melt at a rate which permits continuous use of the molding equipment. Polymer may be extruded as a continuous slab whose dimensions are appropriate to the size of the extruder and the molds. For example, the slab may be from one-half to 6 inches thick and 10–60 inches wide. For each mold filling, a predetermined amount of polymer is cut from the continuous slab, by hand or by automatic equipment. For example, about 47 lbs. of polypropylene is required for a mold of 10 sq. feet cross section to produce a billet of 1 inch thickness. The invention lends itself readily to the production of billets of one-fourth inch or greater thickness. Billets of one-half inch to 2 inch thickness are particularly useful. The molding pressure required for producing satisfactory void-free articles is generally in the range from 10 to 400 p.s.i. While higher pressures can be used without adverse effects, they are not ordinarily required. With an inflated liner such as 14c, molding pressures of 10 to 20 p.s.i. are generally preferred and even lower pressures may be sufficient. With a solid rubber liner the pressure required to mold void-free articles is generally between about 50 and about 100 p.s.i., but lower pressures, down to about 20 p.s.i. minimum may also give useful results, and higher pressures may be employed if desired.

The melt should be at a temperature above its melting point when placed in the mold. If the mold is heated to about the temperature of the melt, the resulting article can have top and bottom surfaces equal in quality to the mold surfaces. However, polymer may be placed into a relatively cool mold, e.g., one at 60°–200° F., to shorten the cycle time. In that case, the surface which contacts the cool mold may have imperfections but these can be readily trimmed off the molded article.

After the mold is closed and under pressure, at least one, and preferably both, of the heat-conducting dies are cooled, e.g., by circulating cooling water through internal channels, in known manner. The article must remain in the mold under pressure until it is completely solidified. For polypropylene, this means that all of the article is cooled to a temperature of 335° F. or below. With crystalline polymers, best results are obtained when the polymer is retained in the mold until it is substantially fully crystallized. For polymers such as polypropylene, which supercool readily, this requires cooling substantially below the solidification temperature. Polypropylene, for example, is preferably colled under pressure in the mold to the point at which the warmest part is not above about 250° F. The required temperature for substantially complete crystallization is affected, i.e., by polymer structure and presence of other components in the composition. The time required for cooling is a function of factors such as the dimensions of the article, its original temperature, cooling efficiency of the mold, etc. and is best determined for each case by suitable test moldings. It is preferred to remove the article from the mold promptly after it has solidified or crystallized to the desired extent and to pass the article on to further processing steps in which advantage is taken of its remaining sensible heat. However, molded billets can be stored, if desired, and submitted to subsequent operation at room temperature, or after being reheated.

The method of this invention can be used as illustrated for forming individual thick billets for further reshaping. The invention is of advantage for the production of large, thick slabs of polymers from which individual billets can then be cut for further reshaping, e.g., in forming slabs or billets of at least 2 ft.$^2$ area and especially those of at least about 10 ft.$^2$ area with thickness from one-half inch to 2 inches or greater.

The volume of polymer in a one-half inch by 2 ft.$^2$ slab or billet produced according to this invention is about 144 in.$^3$— equal to one-twelfth ft.$^3$ or one "board foot." This volume of polypropylene weighs about 4.7 pounds. Articles of 10 ft.$^2$ area contain five times as much volume and weight of polymer, i.e., about 25 pounds if the article is one-half inch thick and the polymer is polypropylene. A 2 inch thick four by eight slab of polypropylene contains 64 board feet and weighs about 250 pounds. This invention is especially useful for the production of slabs and billets containing from 1 to 100 board feet of polymer and in the weight range from over 4 to about 500 pounds.

The cooling time required to solidify an article in the mold varies approximately as the square of the thickness. A time of at least about 5 minutes is required to solidify an article of one-half inch thickness; articles of 1 inch, 1½ inch, and 2 inch thickness require at least about 20, 45 and 80 minutes cooling time for complete solidification.

Although the preferred mode of this invention is directed to production of articles of uniform thickness throughout, it may also be employed in forming articles having some variation in thickness. Accordingly, the term "an article of at least predominantly one-half inch or greater thickness" is employed to refer to those articles in which a minor part of the article has a thickness of less than one-half inch.

This invention is particularly applicable to compositions in which the polymeric thermoplastic material is solid isotactic polypropylene or high-density polyethylene. As pointed out above, it is uniquely useful as part of an integral process for shaping such polymers of extraordinarily high molecular weight which cannot be practically shaped by other available economical polymer shaping methods, but it is also applicable to solid polymers in the molecular weight range conventionally employed in production of plastic articles. The invention is of special advantage in forming void-free billets from crystalline polymers, such as linear or high-density polyethylene and isotactic polypropylene and other stereoregular thermoplastic polyolefins. It may also be employed to advantage in forming billets from other thermoplastic polymers, such as polyamides (nylon), polyacetals, polycarbonates, polyvinylchlorides, and the like, and is of particular advantage for those polymers which shrink substantially while cooling from the melt.

The polymer compositions may contain various types of known additives, such as stabilizers against thermal or actinic degradation; pigments or dies; and fillers of various types, including powdered materials and fibrous materials, e.g., talc, glass fibers, asbestos, etc.

The method of this invention is particularly advantageous in the molding of polypropylene compositions containing a substantial amount of inert material such as a pigment, e.g., 0.1 to 2.0 percent of carbon black. It has been found that void formation upon cooling is much more severe in such compositions than in a composition consisting essentially of polypropylene itself. In molding such filled polypropylene compositions according to the present invention, such void formation is completely avoided.

I claim as my invention:

1. A method for forming void-free thermoplastic polymer articles having two dominant planar surfaces normal to the thickness of the article which comprises:

a. placing molten polymer composition, sufficient to provide a formed article of predetermined thickness, into an open mold cavity defined by the lower of a pair of rigid planar surfaces corresponding to one of said dominant planar surfaces of said article and by a deformable heat-insulating body which rests on said lower surface and which defines the perimeter of said article, is essentially rigid when not subjected to force, is capable of flow under molding pressure and is provided with radial grooves at its upper surface;

b. gradually forcing into contact with said polymer and said deformable body the upper of said pair of rigid planar surfaces, substantially parallel to said first planar surface, while permitting trapped air to escape through said grooves;

c. maintaining sufficient force on said rigid planar surfaces to maintain unsolidified polymer in said mold cavity under compression;

d. cooling said molten polymer through at least one of said rigid planar surfaces while under molding pressure for a time sufficient to result in complete solidification of the polymer, a portion adjacent said heat-insulating body remaining relatively soft and deformable so long as any substantial portion of the total polymer mass is still molten; and e. removing the solidified molded article from the mold.

2. The method according to claim 1 wherein said polymer is crystallizable polyolefin and the thickness of said article is in the range from one-fourth to 2 inches.

3. The method according to claim 2 wherein said polymer is polypropylene and said molten polymer is at a temperature in the range from 385° to 535° F.

4. The method according to claim 1 wherein said heat-insulating body is an elastomer ring having flat top and bottom surfaces, a height 1.15 to 1.35 times that of said molded article, a concave inner wall, a straight outer wall, at least four grooves in its upper surface, spaced about equally from each other and having a depth no more than 15 percent of the height of said molded article, said elastomer ring being supported by a concentric outer rigid backup ring which has a height one-fourth to three-fourths that of said molded article and is centered substantially equidistant from the top and bottom surfaces of said elastomer ring.